(12) United States Patent
Ma et al.

(10) Patent No.: US 9,261,992 B2
(45) Date of Patent: Feb. 16, 2016

(54) TOUCH METHOD FOR PALM REJECTION AND ELECTRONIC DEVICE USING THE SAME

(71) Applicant: GIGA-BYTE TECHNOLOGY CO., LTD., New Taipei (TW)

(72) Inventors: Mou Ming Ma, New Taipei (TW); Yi Yuan Liu, New Taipei (TW); Hsiang Yun Kuo, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 134 days.

(21) Appl. No.: 14/075,229

(22) Filed: Nov. 8, 2013

(65) Prior Publication Data

US 2014/0132538 A1   May 15, 2014

(30) Foreign Application Priority Data

Nov. 9, 2012  (TW) .............................. 101141890 A

(51) Int. Cl.
*G06F 3/041* (2006.01)
(52) U.S. Cl.
CPC .............. *G06F 3/041* (2013.01); *G06F 3/0416* (2013.01)
(58) Field of Classification Search
CPC ................................ G06F 3/041; G06F 3/0416

USPC ........................................................... 345/173
See application file for complete search history.

(56) References Cited

U.S. PATENT DOCUMENTS

| 2006/0238517 | A1* | 10/2006 | King et al. ..................... 345/173 |
| 2010/0241887 | A1* | 9/2010 | Chang ............................ 713/323 |
| 2012/0075249 | A1* | 3/2012 | Hoch ............................. 345/174 |

* cited by examiner

Primary Examiner — Long D Pham
(74) Attorney, Agent, or Firm — Chun-Ming Shih

(57) ABSTRACT

The present invention discloses a touch method for palm rejection and an electronic device using the same. The electronic device comprises a touch panel and a control unit, wherein the touch panel has a first detection region and includes a first operation mode and second operation mode, and the touch panel correspondingly performs a clicking or sliding motion by detection at the second operation mode. The control unit is electrically connected to the touch panel, when the first detection region detects a motion at the first operation mode, the touch panel generates a detecting signal correspondingly to be transmitted to the control unit, and then the control unit generates a control signal to the touch panel. Thus, the touch panel activates the first operation mode and ceases the second operation mode correspondingly provided that no motion is detected for a first period of time at the second operation mode.

8 Claims, 6 Drawing Sheets

TOUCH METHOD FOR PALM REJECTION AND ELECTRONIC DEVICE USING THE SAME

FIELD OF THE INVENTION

The invention relates to a touch method and an electronic device using the same, and more particularly to a touch method for palm rejection and an electronic device using the same.

Description of the Related Art

As technologies of the touch hardware and detection are well developed nowadays, the functions of touch-detection are indispensable application technologies for the electronic consumer products, such as the touch panels of smart mobile phones, tablet computers, laptop computers or desktop computers. At the same time, the functions of touch-detection are adapted to the technologies of single-point or multi-points clicking-detection, sliding-detection or pressing-detection. Furthermore, not only the traditional functions of objection-clicking but the functions of picture zoom-in-out, handwriting recognition, objection picked-up or dragging can be achieved by means of the various touch-detection technologies individual or in combination, which is more convenient and intuitional opposite to the traditional input modes so as to form tendencies for replacing the substantial press buttons or mouse and further become necessary input devices for new generation electronic devices.

From above mentioned, the touch panel can detect a user's motions or gestures and perform different functions correspondingly. But when the user proceeds with simple operations, such as music listening, movies seeing or file managing, which needs the functions in response to high moving frequencies of hands to avoid the touch panel once detecting the casual sliding motions or gestures to activate the unnecessary functions correspondingly. In response thereto, the touch panel often turns the unnecessary detection functions off, and merely activates some relatively simple clicking or pickup functions to prevent the user from hitting by accident to generate unnecessary functions, so as to reduce disturbances for the user. Moreover, the touch panel needs to be setup or activated to perform the full touch functions when the user needs other touch functions.

One method for palm rejection of the touch panel is provided with substantial press buttons to form a mechanism of activating or turning off the palm rejection function. Thus, the user can activate or turn off the palm rejection function by pressing the substantial press buttons. But defect of the foregoing is that when the user types rapidly and switches the touch function at the same time, he/she needs to press the substantial press buttons frequently to result in slow motion and disturbances. Another method for palm rejection of the touch panel is provided with software to activate or turn off the palm rejection function by determining the contact area size between the user's hands and the touch panel. For example, it means that the user unintentionally performs the functions of sliding or dragging when the contact area is smaller, such that the palm rejection function is activated correspondingly. On the contrary, the palm rejection function is turned off correspondingly when the contact area is larger. However, defect of the method is that erroneous judgment caused by changes of the user's gestures is easily occurred, such that accuracy of the judgment is diminished.

From above mentioned, how to efficiently judge the user's requirements and activate or turn off the palm rejection function correspondingly is an important issue presently.

BRIEF SUMMARY OF THE INVENTION

In view of the foregoing prior art defects, the present invention is to provide a touch method for palm rejection and an electronic device using the same to resolve the problem that the user needs to press the substantial press buttons frequently to result in slow motion and disturbances via the mechanism of activating or turning off the palm rejection function by ways of the substantial press buttons. In addition, the present invention further resolves the problem of activating or turning off the palm rejection function via software by determining contact area size between the user's hands and the touch panel, which easily make erroneous judgment of the touch panel happen only as a result of changes of the user's gestures, so as to diminish accuracy of the judgment.

Hence, the present invention discloses an electronic device, which comprises a touch panel and a control unit, wherein the touch panel has a first detection region and includes a first operation mode and a second operation mode, and the touch panel correspondingly performs a clicking or sliding motion by detection at the second operation mode. The control unit is electrically connected to the touch panel, when the first detection region detects a motion at the first operation mode, the touch panel generates a detecting signal correspondingly to be transmitted to the control unit, and then the control unit determines based on the detecting signal so as to generate a control signal to the touch panel. Thus, the touch panel activates the second operation mode and ceases the first operation mode according to the control signal, wherein the touch panel activates the first operation mode and ceases the second operation mode correspondingly provided that no motion is detected for a first period of time at the second operation mode.

The present invention further discloses a touch method for palm rejection adapted to the electronic device having a touch panel. The method comprises the following steps: presetting the touch panel as a first operation mode; detecting a motion in a first detection region of the touch panel at the first operation mode, the touch panel generating a detecting signal correspondingly to be transmitted to a control unit of the electronic device; determining by the control unit whether the motion is an activating command according to the detecting signal, if the motion is the activating command, the control unit generates a control signal to the touch panel correspondingly; driving the touch panel to activate a second operation mode and cease the first operation mode correspondingly according to the control signal, and performing a clicking or sliding motion by detection at the second operation mode correspondingly; controlling the touch panel by the control unit to activate the first operation mode and cease the second operation mode correspondingly provided that no motion is detected for a first period of time at the second operation mode, wherein the control unit controls the touch panel merely perform a function corresponding to the detecting signal provided that the control unit determines that the motion is not the activating command.

The objective of the present invention is to divide the touch panel into the first detection region and the second detection region, such that the touch panel can detect the special motions and gestures input by the user, and the control unit determines correspondingly whether the motions are activating commands so as to drive the touch panel to switch between two modes to activate or turn off the touch functions as the user required. Therefore, the present invention not only enhances the convenience on operation but not raises designing difficulties of the electronic device since the electronic device of the present invention needs not to adopt the technologies of the substantial press buttons of the prior art. At the same time, the touch panel can avoid the function for palm rejection being activated or turned off unnecessarily to reduce disturbances for the user when erroneous judgment caused by changes of the user's gestures is occurred.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
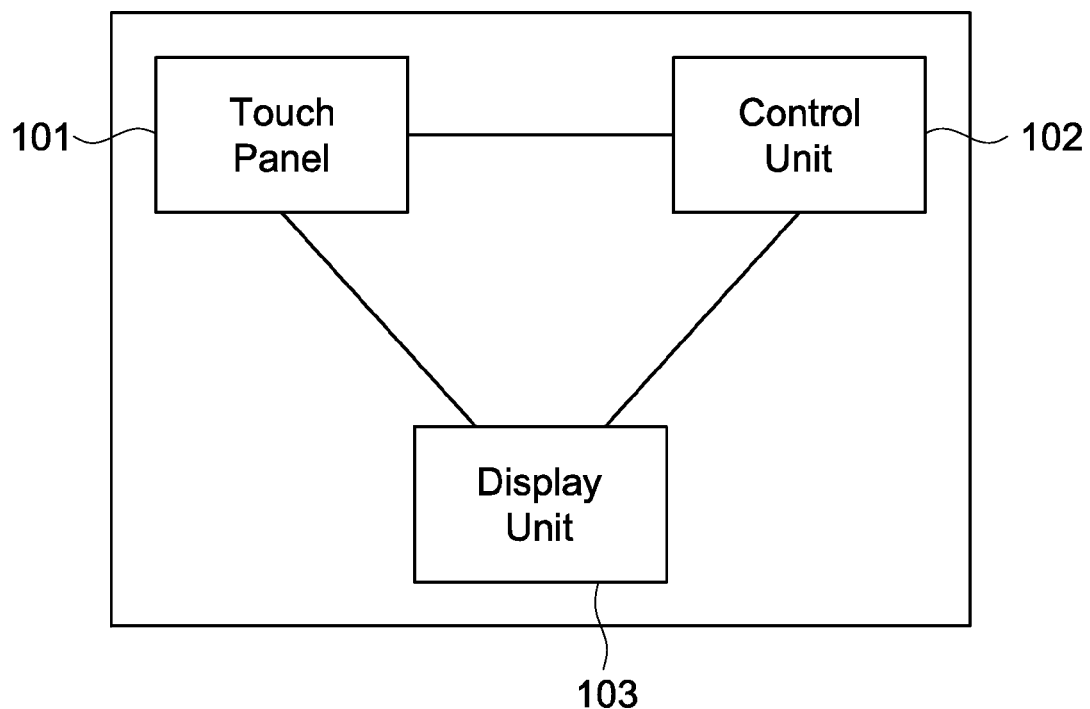
FIG. 1 is the block diagram of the electronic device using the touch method for palm rejection according to the present invention.
Figure 2:
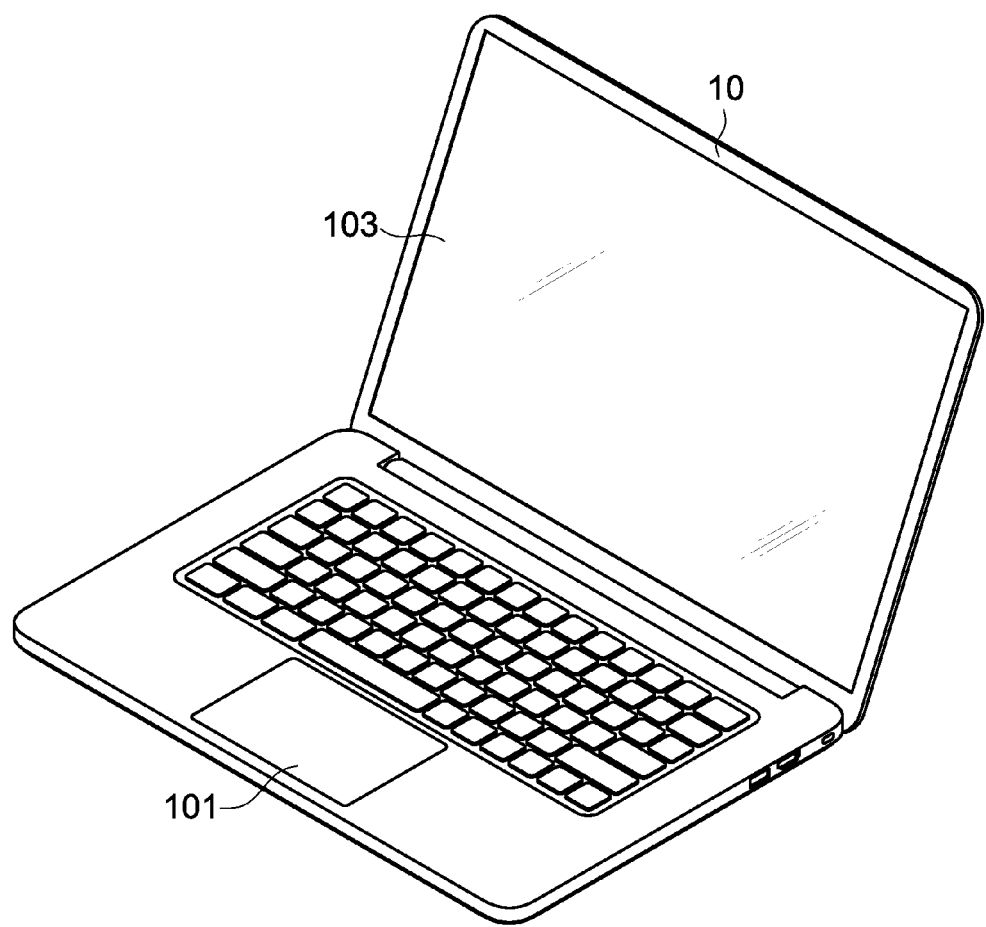
FIG. 2 is the perspective diagram of one embodiment of the electronic device according to the present invention.
Figure 3:
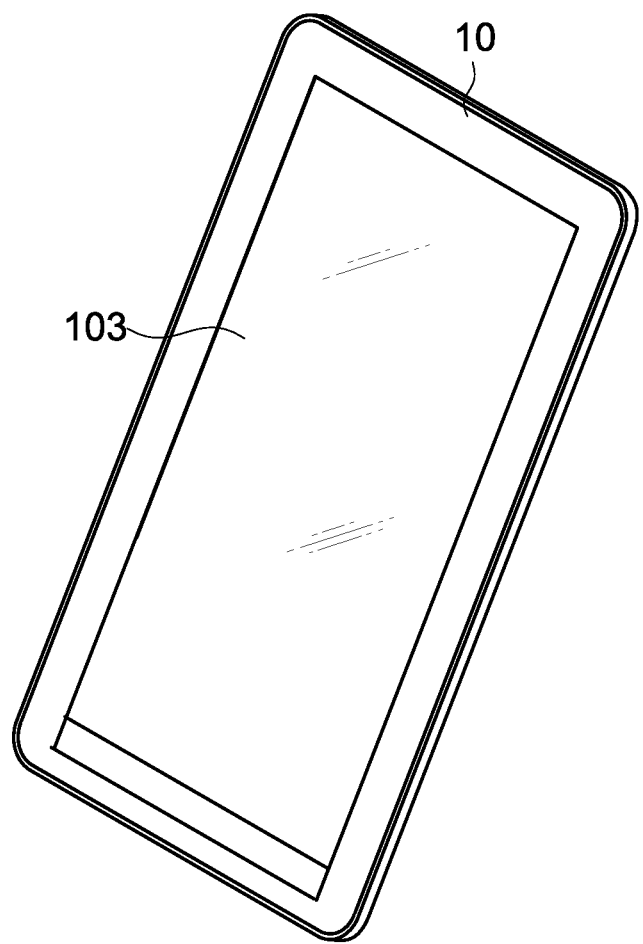
FIG. 3 is the plan diagram of another embodiment of the electronic device according to the present invention.

Please refer to the FIG. 1, one embodiment of the present invention discloses an electronic device 10 which comprises a touch panel 101, a control unit 102 and a display unit 103, wherein the electronic device 10 includes but not limited to a smart mobile phone, tablet computer, laptop computer or desktop computer that are provided with the touch panel 101, such as the laptop computer shown in the FIG. 2 or the tablet computer and smart mobile phone shown in the FIG. 3.

While the disclosure has been described in terms of what is presently considered to be the preferred embodiment, such as the touch panel of the tablet computer shown in the FIG. 3, it is to be understood that the disclosures need not be limited to the disclosed embodiments. On the contrary, it is intended to cover various modifications and similar arrangements included within the spirit and scope of the appended claims which are to be accorded with the broadest interpretation so as to encompass all such modifications and similar structures.

Figure 4A:
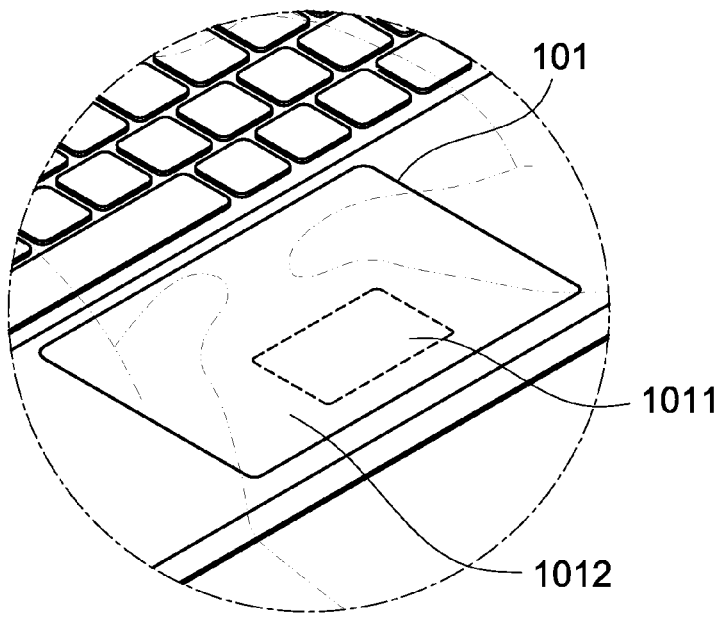
FIG. 4A is the perspective diagram of one embodiment of the dividing way of the touch panel according to the present invention.
Figure 4B:
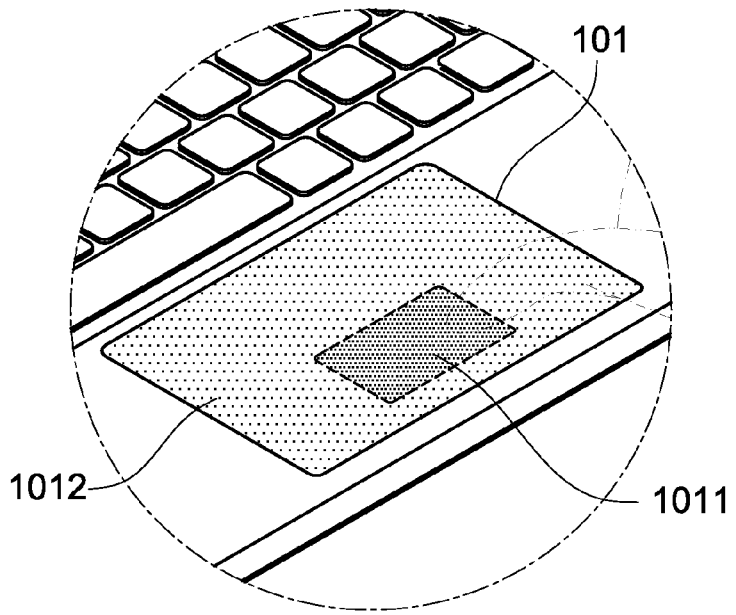
FIG. 4B is the perspective diagram of another embodiment of the dividing way of the touch panel according to the present invention.

Please refer to the FIG. 4A to FIG. 4B, and refer to the FIG. 1 and FIG. 2 at the same time, the touch panel 101 of the electronic device 10 is divided into a first detection region 1011 and a second detection region 1012, and it's worth noting that the first detection region 1011 and the second detection region 1012 either can be two independent sections on the touch panel 101, or the second detection region 1012 is the remaining section on the touch panel 101 except for the first detection region 1011 thereon after defining the first detection region 1011. Besides, the first detection region 1011 is distinguished from the second detection region 1012 by different lines, colors, materials or installed locations, but it should not be taken in a limiting sense. That is, the dividing ways should be adopted in the present invention as long as the user can easily distinguish the first detection region 1011 from the second detection region 1012.

Figure 4C:
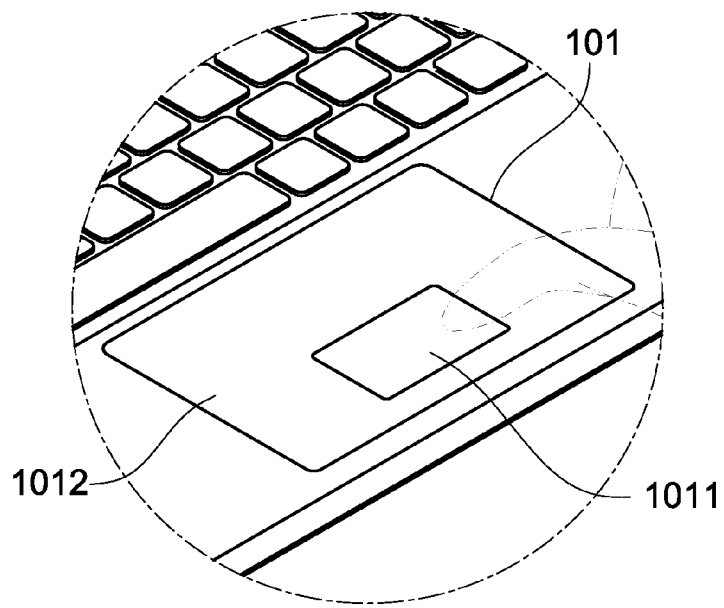
FIG. 4C is the perspective diagram of another embodiment of the dividing way of the touch panel according to the present invention.

As shown in the FIG. 4A, the embodiment is exemplified with that the first detection region 1011 is distinguished from the second detection region 1012 by different installed locations on the touch panel 101, and the first detection region 1011 is installed on the locations closest to the placement of the user's thumbs when on operation, which is convenient for the user to touch the first detection region 1011 without adjusting his/her hands postures. Moreover, as shown in the FIG. 4B, the embodiment is exemplified with that the first detection region 1011 is distinguished from the second detection region 1012 by different colors, for example, the first detection region 1011 is used a dark color and the second detection region 1012 is used a light color contrarily, which is useful for the user to identify the difference visually. As shown in the FIG. 4C, the embodiment is exemplified with that the first detection region 1011 is distinguished from the second detection region 1012 by different lines, for example, the first detection region 1011 is used an external frame so as to make the difference from the second detection region 1012, which is also useful for the user to identify the difference visually. Similarly, as shown in the FIG. 4D, the embodiment is exemplified with that the first detection region 1011 is distinguished from the second detection region 1012 by different materials, for example, the first detection region 1011 is used a smooth material, such as a smooth plastic material, and the second detection region 1012 is used a rough material contrarily, such as a texture plastic material, which enhances the working efficiency for the user to contact directly to identify the difference without any visual identification.

In addition, the touch panel 101 has a first operation mode and a second operation mode, and the touch pane 101 does not perform correspondingly any motions by detection at the first operation mode. In other words, although the touch pane 101, at a locking phase, can detect any motions and gestures at the first operation mode, but the touch panel 101 still fails to perform programs or functions corresponding to the motions. On the contrary, the touch panel 101 responses to the motions and gestures, such as the clicking or sliding motions, at the second operation mode, that is, the touch panel 101 can detect all motions and gestures at the second operation mode and further generate responsive signals or motions. It's worth noting that the touch panel 101 can perform the functions of detection and generate responsive signals or motions either at the first operation mode or at the second operation mode, and those skilled in the art can further adjust the detection functions of the touch panel 101 at the different modes according to the user's requirements or hardware configurations.

Besides, the control unit 102 of the electronic device 10, electrically connected to the touch panel 101, is used for controlling the touch panel 101, and the display unit 103 of the electronic device 10, electrically connected to the control unit 102 and the touch panel 101 respectively, is used for displaying the touch panel 101 operated at the first or second operation mode. It's worth noting that in some electronic devices, such as a smart mobile phone or tablet computer, the touch panel 101 and the display unit 103 are integrated into a single touch screen to combine the functions of touching, detecting and displaying. However, the inventors describe the present invention hereinafter with the electronic device 10 having the unique touch panel 101 and the unique display unit 103.

Figure 4D:
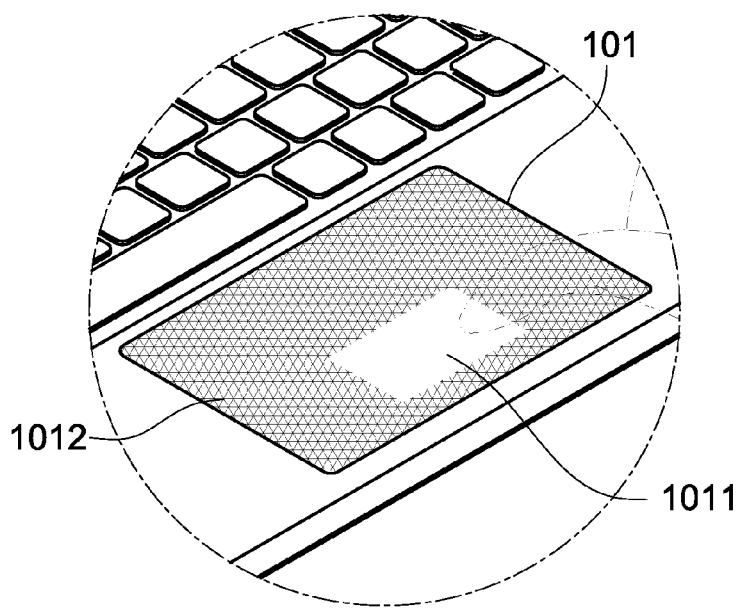
FIG. 4D is the perspective diagram of another embodiment of the dividing way of the touch panel according to the present invention.
Figure 5:
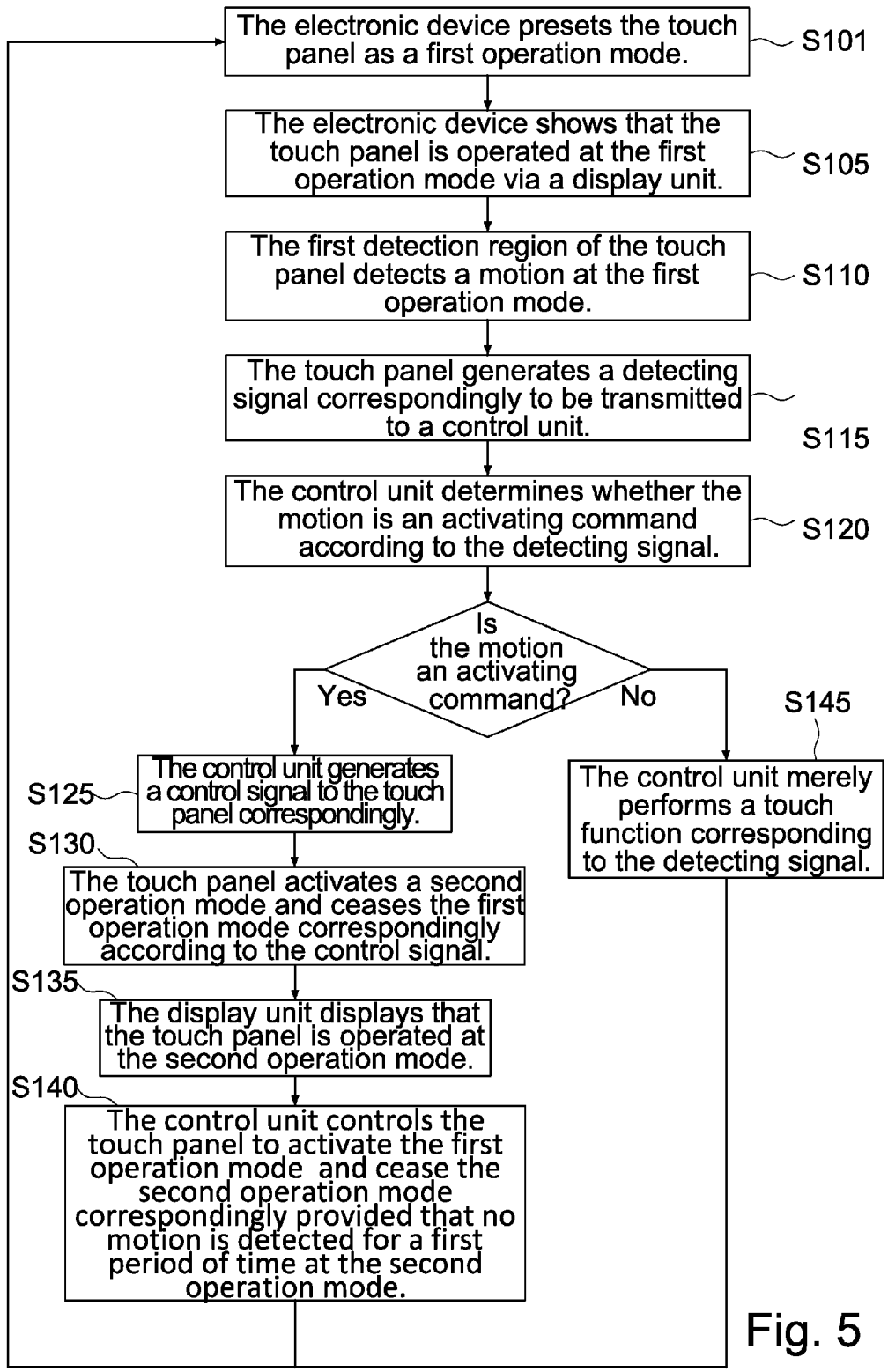
FIG. 5 is the flow chart of the touch method for palm rejection according to the present invention.

Please refer to the FIG. 5, and refer to the FIG. 1 to the FIG. 4D at the same time, the touch method for palm rejection according to the present invention comprises the following steps: First, the electronic device 10 presets the touch panel 101 as the first operation mode, wherein the touch panel 101 does not perform correspondingly any motions by detection (S101). Thus, the touch panel 101 activates the function for palm rejection, and the touch panel 101 can detect any motions and gestures but fail to perform programs or functions corresponding to the motions. At the same time, the electronic device 10 shows that the touch panel 101 is operated at the first operation mode via the display unit 103 (S105). Furthermore, the first detection region 1011 of the touch panel 101 detects a motion at the first operation mode (S110), and the touch panel 101 generates a detecting signal correspondingly to be transmitted to the control unit 102 (S115).

It's worth noting that the motion includes but not limited to a pressed motion lasted for a second period of time, such that when the first detection region 1011 detects a motion lasted for the second period of time, e.g. 3 seconds, the touch panel 101 determines that the motion is the pressed motion and generates the detecting signal correspondingly to be transmitted to the control unit 102. Similarly, the touch panel 101 transmits the corresponding detecting signal to the control unit 102 by means of the sliding motion extended from the first detection region 1011 to the second detection region 1012. The user can setup the touch panel 101 capable of detecting different motions and gestures by means of the electronic device 10, but it should not be taken in a limiting sense.

From above mentioned, the control unit 102 determines whether the motion, detected in the first detection region 1011 of the touch panel 101, is an activating command according to the detecting signal (S 120), if the motion is the activating command, the control unit 102 generates a control signal to the touch panel 101 correspondingly (S125). The touch panel 101 then activates the second operation mode and ceases the first operation mode correspondingly according to the control signal (S130). That is, the touch panel 101 switches to the second operation mode and activates the functions corresponding to the motions and gestures, such as the clicking or sliding motions, and the touch panel 101 will detect the motions and gestures and perform the motions correspondingly at the same time. The display unit 103 displays that the touch panel 101 is operated at the second operation mode, and if the continuous motions are detected by the touch panel 101 at the second operation mode, the touch panel 101 will keep operation at the second operation mode; however, the control unit 102 controls the touch panel 101 to activate the first operation mode and cease the second operation mode correspondingly provided that no motion is detected for a first period of time, e.g. 3 seconds, at the second operation mode (S140).

In other words, no motion is detected for a period of time at the second operation mode, which means the user does not need the touch functions of the touch panel 101 anymore. Therefore, the control unit 102 controls the touch panel 101 to switch to the original first operation mode and never perform the programs or functions corresponding to the motions by detection. That is to say, the touch panel 101 activates the function for palm rejection again to prevent the user from hitting by accident at the second operation mode because the user forgets to switch to the first operation mode. In sum, it is more concise that the touch panel 101 automatically switches to the first operation mode after a period of time without operation.

In view of the foregoing, the control unit 102 merely performs the touch function corresponding to the detecting signal and does not switch to the different modes and then repeatedly performs the step S101, provided that the control unit determines that the detecting signal is not the activating command but a general motion.

It's worth noting that the first period of time and the second period of time are adjustable by the user via the electronic device 10. In addition, the switching mechanism of the different modes is merely operated inside the electronic device 10, and the user can not immediately judge whether the mode is operated, thus the display unit 103 is provided with displaying which mode operated on the touch panel 101 to be known by the user. And the moment of displaying is also adjustable by the user's demand, such that the operation mode can be either displayed on the display unit 103 permanently or displayed only at the moment of switching to another operation mode. The objective of the present invention is to prevent the user from hitting by accident, thus the user can switch to the accurate operation mode in no time once he/she recognizes the current operation mode not as required.

At the same time, the present invention discloses another computer-readable storage device storing a program to be adapted to the electronic device 10 and the touch method for palm rejection accordingly.

The touch method for palm rejection and the electronic device using the same according to the present invention, divide the touch panel into the first detection region and the second detection region by clear and identifiable ways. Further, the touch panel detects the special motions and gestures input by the user, and the control unit determines correspondingly whether the motions are activating commands so as to drive the touch panel to switch between two operation modes to activate or prohibit the touch functions as the user required according to the function for palm rejection. Therefore, the present invention not only enhances the convenience on operation but not raises designing difficulties of the electronic device since the electronic device of the present invention needs not to adopt technologies of the substantial press buttons of the prior art.

Since the certain detection regions are divided, the touch panel can avoid the function for palm rejection being activated or turned off unnecessarily to reduce disturbances for the user when erroneous judgment caused by changes of the user's gestures is occurred. As a result, the present invention not only raises the willingness for use but makes the user well known the current operation mode of the touch panel via the display unit.

While the invention has been described by way of example and in terms of the preferred embodiments, it is to be understood that the invention is not limited to the disclosed embodiments. To the contrary, it is intended to cover various modifications and similar arrangements. Therefore, the scope of the appended claims should be accorded the broadest interpretation so as to encompass all such modifications and similar arrangements.

What is claimed is:
1. An electronic device comprising:
a touch panel having a first detection region and a second detection region, and including a first operation mode and a second operation mode, wherein the first detection region and the second detection region of the touch panel is capable of correspondingly performing a clicking or sliding motion by detection at the second operation mode; and a control unit electrically connected to the touch panel, wherein the touch panel is preset to operate at the first operation mode, when the first detection region detects a pressed motion lasted for a first period of time at the first operation mode, the touch panel generates a detecting signal correspondingly to be transmitted to the control unit, the control unit determines based on the detecting signal so as to generate a control signal to the touch panel, and the touch panel activates the second operation mode and ceases the first operation mode according to the control signal, wherein the touch panel activates the first operation mode and ceases the second operation mode correspondingly provided that no motion is detected for a second period of time at the second operation mode.

2. The electronic device as claimed in claim 1, wherein the first detection region is distinguished from the second detection region by different lines, colors or materials.

3. The electronic device as claimed in claims 2, further comprising a display unit electrically connected to the control unit and the touch panel, wherein the display unit is used for displaying the touch panel operated at the first or second operation mode.

4. The electronic device as claimed in claim 1, wherein the first detection region is distinguished from the second detection region by installed locations on the touch panel.

5. The electronic device as claimed in claims 4, further comprising a display unit electrically connected to the control unit and the touch panel, wherein the display unit is used for displaying the touch panel operated at the first or second operation mode.

6. The electronic device as claimed in claims 1, further comprising a display unit electrically connected to the control unit and the touch panel, wherein the display unit is used for displaying the touch panel operated at the first or second operation mode.

7. A touch method for palm rejection adapted to an electronic device having a touch panel, the touch panel having a first detection region and a second detection region, the method comprising:

presetting the touch panel to operate at a first operation mode;

detecting a pressed motion lasted for a first period of time in the first detection region of the touch panel at the first operation mode, the touch panel generating a detecting signal correspondingly to be transmitted to a control unit of the electronic device;

determining by the control unit whether the motion is an activating command according to the detecting signal, if the motion is the activating command, the control unit generates a control signal to the touch panel correspondingly;

driving the touch panel to activate a second operation mode and cease the first operation mode correspondingly according to the control signal, wherein the first detection region and the second detection region of the touch panel is capable of performing a clicking or sliding motion by detection at the second operation mode correspondingly; and controlling the touch panel by the control unit to activate the first operation mode and cease the second operation mode correspondingly provided that no motion is detected for a second period of time at the second operation mode, wherein the control unit controls the touch panel not to perform a function corresponding to the detecting signal provided that the control unit determines that the motion is not the activating command.

8. The touch method as claimed in claims 7, further comprising: displaying the touch panel operated at the first or second operation mode by a display unit.

* * * * *